United States Patent [19]

Dinklage et al.

[11] Patent Number: 4,525,418
[45] Date of Patent: Jun. 25, 1985

[54] TWO-LAYERED PACKAGING MATERIAL FOR FOODSTUFFS ONE LAYER OF WHICH COMPRISES A POLYMER BLEND

[75] Inventors: Horst Dinklage, Dieburg; Herbert Fink, Bickenbach; Hans-Peter Wolf, Ostercappeln, all of Fed. Rep. of Germany

[73] Assignee: Röhm GmbH, Darmstadt, Fed. Rep. of Germany

[21] Appl. No.: 444,723

[22] Filed: Nov. 26, 1982

[30] Foreign Application Priority Data

Dec. 1, 1981 [DE] Fed. Rep. of Germany ....... 3147519

[51] Int. Cl.³ .................. A22C 13/00; A23G 4/10; B32B 27/12; B32B 27/36
[52] U.S. Cl. .................................... 428/264; 426/105; 426/130; 428/265; 428/267; 428/270; 428/272; 428/274; 428/288; 428/290
[58] Field of Search .............. 426/105, 130; 428/264, 428/265, 267, 270, 272, 274, 288, 290

[56] References Cited

U.S. PATENT DOCUMENTS

| | | |
|---|---|---|
| 3,875,099 | 1/1975 | Kurth et al. |
| 4,248,912 | 2/1981 | Gerigh et al. ................. 426/105 |
| 4,287,217 | 9/1981 | Hammer et al. ............... 426/105 |
| 4,356,200 | 10/1982 | Hammer et al. ............... 426/105 |
| 4,401,136 | 8/1983 | Porrmann ...................... 426/105 |

FOREIGN PATENT DOCUMENTS

| | | |
|---|---|---|
| 7391 | 5/1982 | European Pat. Off. |
| 232022 | 7/1910 | Fed. Rep. of Germany . |
| 609129 | 2/1932 | Fed. Rep. of Germany . |
| 859107 | 12/1952 | Fed. Rep. of Germany . |
| 1910488 | 3/1970 | Fed. Rep. of Germany . |
| 1804159 | 7/1970 | Fed. Rep. of Germany . |
| 1910532 | 9/1970 | Fed. Rep. of Germany . |
| 1917265 | 10/1970 | Fed. Rep. of Germany . |
| 2128613 | 12/1972 | Fed. Rep. of Germany . |
| 2228515 | 1/1974 | Fed. Rep. of Germany . |
| 0001545 | 5/1979 | Fed. Rep. of Germany . |
| 2833601 | 2/1980 | Fed. Rep. of Germany . |
| 2102508 | 4/1972 | France . |
| 13091 | 4/1972 | Japan ........................... 426/105 |
| 1261672 | 1/1972 | United Kingdom . |
| 1266246 | 3/1972 | United Kingdom . |
| 1292883 | 10/1972 | United Kingdom . |
| 1408363 | 10/1975 | United Kingdom . |

*Primary Examiner*—James C. Cannon
*Attorney, Agent, or Firm*—Curtis, Morris & Safford

[57] ABSTRACT

What is disclosed is a two-layered packaging material for the direct contact packing of food products, said material comprising cloth coated with a first acrylate emulsion polymer, formulated to be soft, comprising:

(a) at least 90 weight percent, based on the total first polymer, of a lipophilic monomer component comprising an ester of acrylic acid and/or of methacrylic acid with a lower alkanol, and from 0 to 10 weight percent, based on said lipophilic component, of a further comonomer, the methyl methacrylate content of said lipophilic component not exceeding 40 weight percent of said total first polymer;

(b) a hydrophilic monomer component having acidic properties, in an amount from 0 to 5 weight percent, based on the total first polymer; and (c) a crosslinking monomer component, in an amount from 0 to 7 weight percent, based on the total first polymer. The emulsion polymer may be used in combination with a second emulsion polymer which is an acrylic resin formulated to be harder than said first polymer, and/or with a third emulsion polymer which acts as a drying agent.

7 Claims, No Drawings

TWO-LAYERED PACKAGING MATERIAL FOR FOODSTUFFS ONE LAYER OF WHICH COMPRISES A POLYMER BLEND

The invention relates to a two-layered wrapping for foodstuffs and to a method for making such a wrapping.

Food technology has traditionally made wide use of heating food products for food preservation. As an alternative or as an additional measure, conditions unfavorable to the growth of microorganisms have been created, for example by adding common salt and other preservatives, through a high sugar or alcohol content and the like, or physically by freezing, vacuum packaging, etc.

Traditional food technology has established certain appearances for food products which the consumer associates with a natural, unadulterated food product, for example sausage in a natural gut casing. Actually, the use of natural casings, to the extent that they are available, is not without problems. Natural casings may have a fairly high content of heat resistant spores of anaerobes. This is why the industry has long sought to develop suitable substitutes for natural gut casings. One of the first substitutes was animal skin collagen, which can be reconstituted from solutions and processed into sausage casings and the like. Since the layer of connective tissue of natural casings also consists of collagen, both types of casings have similar properties, that is to say, they possess permeability to water vapor and gas, are capable of being smoked, and shrink along with the sausage meat during the drying process in the aging of the sausage product so that the casing always encloses the latter like a skin. Sausage casings made of regenerated cellulose (viscose tubes) have also come into wide use. While these likewise have permeability to water vapor and gases, they do not shrink as readily, with the result that after the sausage product has been aged it is enclosed in a wrinkled casing. This leads the consumer to believe that the sausage is not fresh.

Special types of viscose tubes are provided on the inside with a thin impregnated layer of, for example, hardened gelatin (German Pat. No. 609,129), or of high molecular weight hydrocarbons or esters of high molecular weight fatty acids in combination with a film base such as methylcellulose (German Pat. No. 859,107).

Also on the market are viscose casings with a resin coating that is impermeable to water vapor and gases. Such a casing material is known from German Pat. No. 19 17 265. It is formed of a special viscose layer consisting of a thermoplastically bonded two ply nonwoven fabric made of viscose fibers, including a portion of thermoplastic binder fibers, which are impregnated with gelatin, methylcellulose, or protein, the top ply of the nonwoven fabric being coated with polyvinylidene chloride.

German patent application DOS No. 21 28 613 discloses an artificial casing for the making of fresh sausage, as well as sausages to be cooked such as frankfurthers and the like, which is formed of a fibrous resin material processed into a spun nonwoven fabric. According to that patent application, solutions or dispersions of polyvinyl chloride/polyvinylidene chloride copolymers, acrylates, isocyanates, polyurethanes, caseinates, and other synthetic resin finishing material may be used for mechanical stabilization of the spun nonwovens.

Moreover, there are sausage casings for frankfurters and the like which are made of thermoplastic materials and provide assurance against weight losses, and hence against reduced earnings for the sausage maker and vendor. For the same purpose, sausage casings made of collagen and enclosed in a second wrap made of thermoplastic material have been used.

For the making of fresh sausage, however, only sausage casings which are permeable to water vapor and gases are suited, since these do not interfere with the aging or ripening process, which is accompanied by gas exchange and liquid penetration. Fabrics such as cheesecloth and the like are used on a fairly large scale for this purpose.

In practice there is a need to be able visually to distinguish high quality sausage products from cheaper products. Packaging materials comprising a textile are particularly appropriate in this respect because they can be cut and sewn not only into practically any desired shape, for example not only those familiar from natural casings such as that of a bladder, butt, shank, or sheath, but also into different shapes, for example those of a bottle, piglet, or Easter bunny, etc.

Such cloth casings are suited for making fresh sausage since fresh sausage meat is rather coarsely divided and dry. However, they are not suited for make sausages to be boiled, such as frankfurters and the like, since liquid would exude through the cloth from the meat used in making such sausages. The appearance of the sausage then would also be unsatisfactory because the mass oozing out would coagulate in boiling and form a deposit on the skin of the sausage. Besides, that deposit would make an excellent nutrient medium for microorganisms, which would have an adverse effect on the shelf life of the sausage. Also, the exudation of sausage mass would give the sausage a wrinkled appearance.

A remedy might be to coat the cloth casings with a synthetic resin. What militates against this is that the permeability to water vapor and gas then would probably be low. Moreover, if the cloth casings were coated on the outside, the sausage meat would be likely to adhere tenaciously to the cloth, which would make it difficult to peel off the sausage casing. Conversely, if the plastic coating were on the insides, particles of the coating might well adhere to the sausage. Another possibility would be to coat a cloth casing with a glue size, as proposed in German Pat. No. 232,002 for example. However, the use of glue casings frequently gives rise to the formation of spots.

Thus, there has been a need to make available a textile packaging material for food products which is usable with few, if any, restrictions, whose appearance closely resembles that of the food product in its traditional form, which is impervious to liquids and fats, and which can readily be peeled off. Other desirable properties are good storage stability and relative insensitivity to microbial growth. In addition, the packaging material should make possible a saving in weight by comparison with alternative modes of preservation, for example natural gut casings in the case of sausage. Moreover, the packaging material should permit smoking. And in view of its use as a sausage casing, the packing material should further have a certain tearing behavior.

It has now been found that sheetlike textile articles, and more particularly cloth, coated with an acrylic resin, substantially meet these technical requirements. A suitable textile backing material is cloth, in addition to reinforced nonwovens and spun nonwovens. The fibers use may be natural fibers, modified natural fibers, synthetic fibers, or mixtures thereof. In particular, cotton, linen, wool, silk, cellulose esters, regenerated cellulose, polyesters, polyamides, polyacrylonitrile fibers, polypropylene fibers, and polyvinyl chloride fibers are suitable.

The acrylic resins which in accordance with the invention are suitable coating materials are primarily emulsion polymers or copolymers of esters of acrylic acid and/or of methacrylic acid, and preferably of acrylic acid, which are predominantly formulated to be hydrophobic. The acrylic resins intended for coating may be used in the form of solutions in organic solvents but are preferably used as aqueous dispersions. In selecting the ingredients of the polymers, care should be taken to assure that the coating will not be sticky and will not embrittle. As will be explained further on, mixtures of polymers of a "softer" type and of a "harder" type, optionally in combination with a "drying agent", are therefore used to particular advantage.

More in particular, according to the present invention a cloth is coated with a first acrylate emulsion polymer, formulated to be soft, which comprises (a) at least 90 weight percent, based on the total first polymer, of a lipophilic monomer component formed of esters of acrylic acid and/or of methacrylic acid with lower alkanols and of from 0 to 10 percent, based on this component, of further comonomers, the methyl methacrylate content not exceeding 40 weight percent of the total first polymer;

(b) a hydrophilic monomer component having acidic properties, in an amount from 0 to 5 weight percent based on the total first polymer; and (c) a crosslinking monomer component, in an amount from 0 to 7 percent, based on the total first polymer. The coating may further include a second emulsion polymer which is an acrylic resin formulated to be harder, and/or a third emulsion polymer which acts as a drying agent.

The amount of lipophilic or water insoluble monomers in the total first polymer will generally be high in the case of all suitable types of emulsion polymers, usually at least 90 weight percent, and preferably 93 weight percent. The lipophilic portion is composed predominantly or exclusively of esters of acrylic acid or of esters of methacrylic acid; however, other monomers may also be used, and in such proportions that the desired properties of the polymers, and especially the desired mechanical properties of the coatings, are obtained. Acrylate and methacrylate esters of lower alkanols, for example $C_1$ to $C_5$ alcohols, are primarily suitable. However, the proportion of methyl methacrylate must not be too high. That is to say, as a rule it should not exceed 40 weight percent based on the total polymer. The presence in the polymer of a preponderant amount, for example over 60 weight percent, of esters of acrylic acid will be of advantage. Acrylate esters with $C_4$ alcohols have been found to be particularly well suited. In addition to acrylate and methacrylate esters, suitable comonomers of lipophilic type are styrene, alpha-methyl styrene and vinyl acetate, for example. They should normally make up from 0 to 10 percent of the lipophilic component.

The polymers suited for use in accordance with the invention advantageously contain relatively small amounts, usually less than 5 weight percent, and preferably less than 2 weight percent, based on the total polymer, of a second component having acidic properties. Suitable monomers are acrylic and/or methacrylic acid, and in particular the latter, as well as crotonic acid, itaconic acid, maleic acid, fumaric acid, and the like, or their anhydrides.

Finally, the polymers suitable for use in accordance with the invention may contain crosslinking agents in the usual minor amounts, generally under 7 weight percent, and preferably between 4 and 6 weight percent, based on the total polymer.

Suitable crosslinking agents are, for example, difunctional polymerizable monomers such as the acrylate and methacrylate esters of polyols, for example ethylene glycol dimethacrylate, butanediol dimethacrylate, triglycol dimethacrylate, and trimethylolpropane trimethacrylate, as well as allyl compounds such as allyl methacrylate or triallyl cyanurate. Crosslinkable monomers of the type of the nitriles, amides, N-methylolamides and N-methylol ether amides, and in particular acrylamide and methacrylamide and their N-methylol compounds, as well as N,N'-methylene(bis)-acrylamide and; N,N'-methylene(bis)-acrylamide, are also suitable for use.

Particularly advantageous is the use of a mixture of a first or primary, "soft", lipophilic acrylic resin dispersion of the type just described, that is to say a resin composed largely (to the extent of over 90 weight percent) of acrylate esters, and especially of butyl acrylate; of a second, "harder", acrylic resin dispersion composed predominantly (to the extent of over 60 weight percent) of methyl methacrylate; and/or appropriately of a third emulsion polymer acting as a solid "drying agent", optionally with the presence of a thickening agent approved for use with food products.

The primary or first-mentioned emulsion polymer preferably further contains a crosslinking agent in an amount of about $3\pm1$ weight percent; an acid component (b) (see above), and in particular methacrylic acid, in an amount of about 1 weight percent; and optionally, as a "harder" monomer, methyl methacrylate in a minor amount, for example, from 0 to 5 weight percent. The pH value of this dispersion, when used in the acid range, will be in the neighborhood of 2, for example.

The minimum film forming temperature (in conformity with DIN 53 787) of this first emulsion polymer will be in the vicinity of 0° C. The dynamic glass transistion temperature, $Tg_{max}$ (in conformity with DIN 53 445), will usually be below 0° C. and preferably ranges from $-30°$ to $-34°$ C.

The viscosity of this first emulsion polymer will generally range from 400 to 2,000 mPa.sec and the particle size will advantageously be between 300 and 600 nm, and preferably between 340 and 400 nm.

The second, "harder", emulsion polymer contains, in addition to a predominant proportion (over 60 weight percent) of methyl methacrylate, "softer" monomers such as esters of acrylic acid with lower alcohols, and in particular butyl acrylate, in a proportion of under 40 weight percent (a guide value being about 35 weight percent), and as a harder component, a monomeric acid such as methacrylic acid in a proportion of less than 5 weight percent (a guide value being about 1 weight percent).

The minimum film forming temperature of this second emulsion polymer will usually range from 30° to 50° C., a guide value being about 40° C. The dynamic glass transistion temperature, $Tg_{max}$, will be above 30°

C. and preferably ranges from 55° to 70° C. About 60° C. will serve as a guide value.

The particle size may range from 200 to 400 nm and preferably ranges from 240 to 280 nm.

The "drying agent" (or third emulsion polymer) is preferably composed of a spray dried dispersion, usually with a particle size of less than 50 microns. For example, the products known from German patent application DOS No. 28 33 601 are suitable, and in particular spray dried dispersions formed of approximately equal parts of methyl methacrylate and butyl methacrylate and preferably containing about 5 weight percent of a crosslinking monomer.

Suitable thickening agents approved for use with food products are, for example, those listed in Ullmanns Encyclopaedie der Technischen Chemie, 4th ed., vol. 16, p. 80, and in particular modified cellulose ethers such as hydroxyethylcellulose.

The first and second emulsion polymers and the solid materials from the third emulsion polymer are preferably used in a ratio of 50 to 100 parts by weight of the first emulsion polymer to 0 to 50 parts by weight of the second emulsion polymer to 0 to 5 parts by weight of the third emulsion polymer, the latter usually being present, however. A ratio of about 80 parts by weight of the first polymer material to about 20 parts by weight of the second polymer material has proved satisfactory.

In addition, suitable additives such as coloring agents approved for use with food products, and in particular fat insoluble colored pigments, may be incorporated.

As a rule, neither plasticizers nor adhesion promoters will be added. The addition of food preservatives generally can also be dispensed with.

The coating compositions in accordance with the invention can be produced conventionally by mixing the components. For example, the first, second, and third emulsion polymers may be mixed and thickened by the addition of a thickening agent until a spreadable mass having a viscosity of about 20,000 to 80,000 mPa.-sec is obtained. If the mixture is diluted too much, the polymer will penetrate too deeply into the cloth; if it is thickened excessively, too much of it will remain on the surface.

The spreadable mass can be applied to the textile backing material by means of coating devices commonly employed in the coating of fabrics, for example with an air blade, roller, rubber blanket, or rotary stencil coater. Calendering and embossing are dispensed with. The mass may be applied to one side or to both sides of the cloth. Application may be repeated to secure a thicker coating. Generally the structure of the backing material should remain visible and there should be some degree of transparency.

The amount applied will depend to some extent on the textile backing material and on the end use of the packaging material. As a guide, the amount applied may vary from about 30 g of polymer, as solid matter, per square meter (for example, in the coating of casings for cooked sausage and sausages to be boiled such as frankfurters and the like) to about 90 to 100 g of polymer, as solid matter, per square meter when the packaging material is to be waterproof, for example.

A range from 70 to 150 g/m$^2$, and preferably from 80 to 130 g/m$^2$, and more particularly from 100 to 125 g/m$^2$, of cloth will serve as a guide value for the weight per unit area of a viscose rayon staple fiber fabric with a plain weave, a thread count of 27/27 per cm, and 50/50 den.

To some extent, the conditions of application will depend on the type of coating device employed. Generally the drying temperature will range from 120° to 140° C., and the drying time from about 30 seconds to 2 minutes, depending on the drying efficiency of the dryer. When a coating of 100 g/m$^2$ or heavier has been applied, two passes through the dryer (counter to the direction of coating application) may be advisable.

The cloths coated in accordance with the invention are suitable for the packaging of a wide variety of food products, for example those comprising proteins, carbohydrates, and fats. They are also suited for the smoking of the food products. This type of packaging material can be used not only with fresh sausage, boiled sausages such as frankfurters, and cooked sausage, but also with most other kinds of sausages.

A special advantage is that the packaing material can be cut to size in practically any desired manner and made to conform to the shape of the food product.

It can be used to package fish sausage, that is to say, sausage based on fish protein.

Further, it is suited for the packaging of food products embedded in aspic or jelly, as well as for packaging cheese, including soft cheese used for spreads. It is suited also for the packaging of non-pasty or non-spreadable food products, for example instant soups, "pea sausage" (peameal compressed into sausage shape), etc. Finally, it can be used to package fats and fat containing food products, marzipan, chocolate, etc.

The cloths coated in accordance with the invention may be formulated to have permeability to gas and water vapor. They will participate sufficiently in the shrinkage process which occurs during the aging or ripening of food products such as sausage, cheese, etc. Also, they can be depended on to contain the product encased in the packaging material, for example the sausage product.

Other outstanding properties of the packaging material are its aging resistance and its low susceptibilty to microbacterial growth.

In contrast to prior art coatings, the coated cloth of the invention has but little tendency to stick to food products, for example to sausage meat. In other words, the casing can readily be separated from the sausage meat.

Moreover, the packaging material coated in accordance with the invention has just the right mechanical strength, for example a tear resistance and resistance to further tearing comparable to that of natural gut casings.

The coating may be on the inside or on the outside of the packaging material.

Production of the acrylic resins suited for coating is known per se. The dispersions may be prepared conventionally, for example as taught in or based on German patent applications Nos. DOS 18 04 159, 19 10 488, 19 10 532, 22 28 515, and 28 33 601.

In effecting the coating in accordance with the present invention, dispersions having a high solids content, for example dispersions having a solids content of at least 55 weight percent, as disclosed in German patent application DOS No. 19 10 488, are used to advantage.

In the process, the monomer phase formed of the lipophilic, acid, and crosslinking components is polymerized as an emulsion in an aqueous phase in the presence of an anionic emulsifier and of a free radical forming polymerization initiator, wherein (a) the emulsifier concentration at the start of polymerization is selected so within the range from 0.3 to 3 times the critical micelle concentration, based on the amount of water initially charged to the polymerization vessel, that the dispersions formed comprise particles of such average size and in such size distribution that upon centrifugation of the dispersion, diluted to a solids content of 10%, for 15 minutes at 20° C. and at 10,000 times the acceleration of gravity, and with a maximum free sedimentation path of 43 mm, the particles will form a sediment from 10 to 80 weight percent, and preferably from 20 to 60 weight percent, of the resin component;

(b) the entire monomer phase, optionally emulsified with an anionic emulsifier in part of the water phase, is gradually added under polymerization conditions to the water phase, optionally with a portion of the polymerization initiator;

(c) further amounts of the emulsifier are added during the polymerization; and (d) the total amount of the monomer phase makes up at least 55 weight percent of the dispersion.

The emulsion polymerization is carried out with commonly used anionic emulsifiers such as the alkali metal and ammonium salts of sulfated fatty alcohols, aromatic sulfonic acids, or sulfonated ethylene oxide adducts.

Suitable anionic emulsifiers are, for example, hydroxyethylated alkylphenols which have been sulfonated and neutralized with alkali and may have been prepared from nonylphenol or triisobutylphenol adducts with from 3 to 30 ethylene oxide units per molecule. Either the monomer continuous feed or the emulsion continous feed method may be employed.

The use of the emulsion continuous feed method offers special advantages. With this method, only part of the water phase, usually from 10 to 25% of the total amount, is initially charged to the polymerization vessel. In the remainder of the water phase, which contains a portion of the emulsifier and usually also of the initiator, the monomer phase is emulsified under conditions under which polymerization does not occur and the emulsion so formed is gradually introduced into the reaction vessel, where polymerization conditions prevail. It is of considerable importance in all cases that the emulsifier concentration specified above be present in the initially charged water phase at the start of polymerization.

The method can be modified in many different ways. For example, the initiator or a portion of the emulsifier may be gradually fed in or introduced in portions, separately from the monomer phase. The polymerization initiator used most often is an alkali metal or ammonium persulfate; however, in addition thereto or in place thereof, other and preferably water soluble initiators such as 4,4'-azobis-4,4'-dicyanovaleric acid, or redox systems such as persulfates, sulfoxy compounds and iron salts, or hydrogen peroxides and ferrous salts, may be used. The latter are preferably added separately from the monomer phase since they will start the polymerization even at room temperature. The reaction temperature depends on the temperature of decomposition of the initiator and generally ranges from 10° to 100° C.

The examples which follow will serve to illustrate the invention.

EXAMPLE 1

A viscose rayon staple fiber fabric, weight 110 g/m², undyed and desized, was coated with a coating material of the following composition:

666 parts by weight of a 60% dispersion of a first emulsion polymer, 200 parts by weight of a 50% dispersion of a second emulsion polymer, 50 parts by weight of a third emulsion polymer, 8 parts by weight of hydroxyethylcellulose (e.g., "Natrosol 250 HR", a product of Hercules Powder Co., and 76 parts by weight of water.

The first emulsion polymer was prepared in accordance with German patent application DOS No. 19 10 488 from the following monomer mixture:

95 wt. % of butyl acrylate, 3 wt. % of N-methylol methacrylamide, 1 wt. % of methacrylic acid, and 1 wt. % of glycol dimethacrylate.

The second emulsion polymer was prepared in accordance with German patent application DOS No. 22 28 515 from the following monomer mixture:

65 wt. % of methyl methacrylate, 34 wt. % of butyl acrylate, and 1 wt. % of methacrylic acid.

The third emulsion polymer was prepared in accordance with German patent application No. DOS 28 33 601 from the following monomer mixture:

47.5 wt. % of methyl methacrylate, 47.5 wt. % of butyl methacrylate, and 5 wt. % of glycol dimethacrylate.

The solids content of the paste was about 56%. The paste was applied by means of an air blade coater and the coated fabric was dried in a stretched state at from 120° to 140° C. in a flat bed dryer.

Resin coating: About 40 g of solid substance per square meter.

The hand of the material was soft and its surface was tack free. The coating was resistant to boiling and was permeable to air.

A sausage casing in accordance with the invention can be used in making both fresh and strongly smoked sausage. Its good permeability to air provides assurance of uniform smoke absorption during the smoking operation. The cloth casing can readily be peeled from the sausage without the surface of the sausage being marred by sausage meat adhering to the skin.

EXAMPLE 2

Example 1 was repeated, except that the coating paste had the following composition:

535 parts by weight of a 60% dispersion of a first emulsion polymer, 160 parts by weight of a 50% dispersion of a second emulsion polymer, 50 parts by weight of a third emulsion polymer, 9 parts by weight of hydroxyethylcellulose (e.g., "Natrosol 250 HR"), 50 parts by weight of a brown pigment coloring agent approved for use with food products (50% paste), and 196 parts by weight of water.

Solids content of coating paste: 48.5%.

To obtain a resin coating from 90 to 100 g of solid substance per square meter, a roller coater was used. Drying was carried out as in Example 1.

Because of its very low permeability to water vapor, this coated cloth is used in making cooked sausages and sausages to be boiled, such as frankfurters. In cooking or boiling, it takes part in the shrinkage process of the sausage so that the finished sausage is enclosed in a smooth skin.

EXAMPLE 3

Example 1 was repeated, except that a printed cotton fabric was used and that the composition of the coating paste was as follows:

- 583 parts by weight of a 60% dispersion of a first emulsion polymer,
- 300 parts by weight of a 50% dispersion of a second emulsion polymer,
- 9 parts by weight of hydroxyethylcellulose (e.g., "Natrosol 250 HR"), and
- 108 parts by weight of water.

Solids content of coating composition: About 51%.

With a view to not obscuring the colored printed design, the third emulsion polymer was dispensed with, which, however, made it necessary to change the mixing ratio of the solids present in the first and second emulsion polymers from 8:2 to 7:3.

Resin coating: About 40 g solid substance per square meter.

The hand was decidedly firmer than in Examples 1 and 2.

This specimen was used in the making of preserved sausage. The skin of the sausages was permeable to water vapor and exhibited no air holes or wrinkles even after extended storage. The sausages retained their natural appearance.

EXAMPLE 4

The viscose rayon staple fiber fabric of Example 1 was coating with a coating material of the following composition:

- 900 parts by weight of a 60% dispersion of a first emulsion polymer,
- 50 parts of weight of a "drying agent" emulsion polymer,
- 4 parts by weight of hydroxyethylcellulose (as in Example 1), and
- 46 parts by weight of water.

The dry solids content of the paste was about 50%. The paste was applied by means of an air blade coater and the coated fabric was dried in a stretched state at from 120° to 140° C. in a flat bed dryer.

Resin Coating: About 40 g of solid substance per square meter.

The hand of the material was soft and its surface had a slight tack. The coating was resistant to boiling and was permeable to air.

What is claimed is:

1. A two-layered packaging material for the direct contact packaging of food products, said material comprising cloth coated with a binary mixture of 50 to 100 parts by weight of a first acrylate emulsion polymer having a glass transition temperature, $Tg_{max}$, below 0° C. and up to 50 parts by weight of a second acrylate emulsion polymer having a glass transition temperature, $Tg_{max}$, above 30° C., said first acrylate emulsion polymer comprising
    (a) at least 90 weight percent, based on the total first polymer, of a lipophilic monomer component comprising at least one member selected from the group consisting of esters of acrylic acid and of methacylic acid with a lower alkanol, and from 0 to 10 weight percent, based on said lipophilic monomer, of at least one further comonomer, the methyl methacrylate content of the first polymer not exceeding 40 weight percent of the total first polymer;
    (b) a hydrophilic monomer component having acidic properties, in an amount from 0 to 5 weight percent, based on the total first polymer; and
    (c) a crosslinking monomer component in an amount from 0 to 7 weight percent, based on the total first polymer;
    and said second emulsion polymer comprising
    (a) at least 95 weight percent, based on this total second polymer, of a lipophilic monomer component comprising more than 60 weight percent, based on this total lipophilic component, of methyl methacrylate, and of less than 40 weight percent, based on this lipophilic component, of at least one further member selected form the group consisting of esters of acrylic acid and/or of methacrylic acid with a lower alkanol, and of from 0 to 10 weight percent, based on this lipophilic component, of a further monomer; and
    (b) of less than 5 weight percent of a hydrophilic monomer component having acidic properties.

2. A packaging material as in claim 1 wherein said first emulsion polymer comprises over 90 weight percent of at least one acrylate ester which entirely or predominantly butyl acrylate.

3. A packaging material as in claim 1 wherein said first emulsion polymer comprises a crosslinking component in an amount of 3±1 weight percent, based on the total first polymer.

4. A packaging material as in claim 1 wherein the minimum film forming temperature (in conformity with DIN 53 787) of said first emulsion polymer is about 0° C.

5. A packaging material as in claim 1 wherein said coating additionally comprises a thickening agent approved for use with food products.

6. A packaging material as in claim 1 wherein the acidic monomer component of said first or second polymer is at least one member selected from the group consisting of acrylic acid, methacrylic acid, crotonic acid, itaconic acid, maleic acid, and fumaric acid, in an amount of about 1 weight percent, based on the total first or second polymer.

7. A packaging material as in claim 1 wherein the amounts of further member contained in said second emulsion polymer is 35±4 weight percent.

* * * * *